US009548977B2

(12) United States Patent
Gabor

(10) Patent No.: US 9,548,977 B2
(45) Date of Patent: Jan. 17, 2017

(54) SYSTEM, METHOD, AND APPARATUS FOR PERFORMING RELIABLE NETWORK, CAPABILITY, AND SERVICE DISCOVERY

(75) Inventor: Bajko Gabor, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 13/514,290

(22) PCT Filed: Dec. 15, 2010

(86) PCT No.: PCT/FI2010/051031
§ 371 (c)(1),
(2), (4) Date: Jun. 6, 2012

(87) PCT Pub. No.: WO2011/073516
PCT Pub. Date: Jun. 23, 2011

(65) Prior Publication Data
US 2012/0246468 A1  Sep. 27, 2012

Related U.S. Application Data

(60) Provisional application No. 61/287,097, filed on Dec. 16, 2009.

(51) Int. Cl.
*H04L 29/06*  (2006.01)
*H04W 12/06*  (2009.01)
*H04W 48/14*  (2009.01)

(52) U.S. Cl.
CPC .......... *H04L 63/0823* (2013.01); *H04W 12/06* (2013.01); *H04W 48/14* (2013.01)

(58) Field of Classification Search
CPC .... H04L 63/0823; H04W 12/06; H04W 48/14
See application file for complete search history.

(56) References Cited

U.S. PATENT DOCUMENTS

2004/0181692 A1*  9/2004  Wild ................. H04W 48/14 726/4
2007/0206537 A1*  9/2007  Cam-Winget et al. ....... 370/331
(Continued)

FOREIGN PATENT DOCUMENTS

CN  WO 2008034361 A1 *  3/2008  ............. H04L 63/06
EP          1326466 A1      7/2003
(Continued)

OTHER PUBLICATIONS

ITS—2012 NPL—Digital Certificate usage; src=www.utexas.edu/its/help/digital-certificates/845; obtained date: Oct. 6, 2014.*
(Continued)

*Primary Examiner* — Tri Tran
(74) *Attorney, Agent, or Firm* — Mintz Levin Cohn Ferris Glovsky and Popeo, P.C.

(57) ABSTRACT

A system, method, and apparatus are provided for performing reliable network, capability, and service discovery. A method may include providing for transmission of a request for signed access point information. The request may be provided for transmission prior to authenticating with an access point when authentication is performed or prior to associating with an access point when authentication is not performed. The method may further include receiving a response including signed access point information. The method may additionally include verifying the signed access point information using a digital certificate. The method may also include selecting the access point for communication based in least in part on the verified signed access point information. A corresponding system and apparatus is also provided.

15 Claims, 7 Drawing Sheets

(56) References Cited

U.S. PATENT DOCUMENTS

| | | | |
|---|---|---|---|
| 2010/0031029 A1* | 2/2010 | Ilyadis | H04L 9/3271 |
| | | | 713/156 |
| 2010/0031031 A1* | 2/2010 | Tian et al. | 713/156 |
| 2010/0106966 A1* | 4/2010 | Santos | H04L 12/66 |
| | | | 713/156 |

FOREIGN PATENT DOCUMENTS

| | | |
|---|---|---|
| EP | 2034661 A1 | 3/2009 |
| WO | 2008/095291 A1 | 8/2008 |

OTHER PUBLICATIONS

"3rd Generation Partnership Project; Technical Specification Group Service and System Aspects; Security of H(e)NB; (Release 8)", 3GPP TR 33.820, V8.2.0, Sep. 2009, pp. 1-83.

Hu et al., "Fast Solutions for AP-To-AP Handoffs", Proceedings of the 11th Nordic Workshop on Secure IT-systems, Nokia Research Center, Oct. 19-20, 2006, pp. 1-13.

Das et al., "Dynamic Host Configuration Protocol (DHCPv4 and DHCPv6) Options for Access Network Discovery and Selection Function (ANDSF) Discovery", Internet Engineering Task force, Internet Draft, Jul. 12, 2009, pp. 1-9.

"3rd Generation Partnership Project; Technical Specification Group Core Network and Terminals; Access Network Discovery and Selection Function (ANDSF) Management Object (MO); (Release 8)", 3GPP TS 24.312, V8.3.0, Sep. 2009, pp. 1-83.

"Replay Attack", From Wikipedia, Retrieved on May 30, 2013, Webpage available at: en.wikipedia.org/wiki/Replay_attack.

International Search Report and Written Opinion received for corresponding International Patent Application No. PCT/FI2010/051031, dated Apr. 4, 2011, 11 pages.

\* cited by examiner

SYSTEM, METHOD, AND APPARATUS FOR PERFORMING RELIABLE NETWORK, CAPABILITY, AND SERVICE DISCOVERY

RELATED APPLICATION

This application was originally filed as PCT Application No. PCT/FI2010/051031 filed Dec. 15, 2010, which claims priority benefit to U.S. Provisional Patent Application No. 61/287,097, filed Dec. 16, 2009.

TECHNOLOGICAL FIELD

Embodiments of the present invention relate generally to communication technology and, more particularly, relate to a system, method, and apparatus for performing reliable network, capability, and service discovery.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the convenience to users is performing reliable network, capability, and service discovery. In this regard, for example, the user of a computing device may desire to connect to an access point to gain access to a network. The access point may provide identification, capability, and service information to the computing device. Prior to selecting the access point for authentication, however, the computing device may not be able to reliably verify the information provided by the access point.

BRIEF SUMMARY OF SOME EXAMPLES OF THE INVENTION

Various example systems, methods, and apparatuses of the present invention are described herein for performing reliable network, capability, and service discovery. According to some example embodiments, signed identification, capability, and service information for an access point may be requested during the network discovery phase, such that the signed information may be reliably verified prior to selecting an access point for communication. Further, according to various example embodiments, digital certificates may be used to sign and verify the identification, capability, and service information.

In a first example embodiment, a method is provided, which comprises providing for transmission of a request for signed access point information. The request may be provided for transmission prior to authenticating with an access point when authentication is performed or prior to associating with an access point when authentication is not performed. The method of this embodiment further comprises receiving a response comprising signed access point information. The method of this embodiment also comprises verifying the signed access point information using a digital certificate.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least provide for transmission of a request for signed access point information. The request may be provided for transmission prior to authenticating with an access point when authentication is performed or prior to associating with an access point when authentication is not performed. The at least one memory and stored computer program code are configured to, with the at least one processor, additionally cause the apparatus of this embodiment to receive a response comprising signed access point information. The at least one memory and stored computer program code are configured to, with the at least one processor, further cause the apparatus of this embodiment to verify the signed access point information using a digital certificate.

In another example embodiment, a system is provided that comprises one or more access points configured to provide access to one or more networks. The system of this embodiment further comprises a mobile device configured to request signed access point information from the one or more access points; receive a response comprising signed access point information from the one or more access points; and verify the signed access point information using a digital certificate. According to this embodiment, the signed access point information may be requested prior to authenticating with an access point when authentication is performed or prior to associating with an access point when authentication is not performed.

In another example embodiment, a computer-readable storage medium having executable computer-readable program code instructions stored therein is provided. The computer-readable program code instructions of the computer-readable storage medium are for causing an apparatus to perform various functionalities. In this regard, the apparatus is caused to perform providing for transmission of a request for signed access point information. The request may be provided for transmission prior to authenticating with an access point when authentication is performed or prior to associating with an access point when authentication is not performed. The apparatus of this embodiment is further caused to perform receiving a response comprising signed access point information. The apparatus of this embodiment is also caused to perform verifying the signed access point information using a digital certificate.

In yet another example embodiment, an apparatus for performing reliable network, capability, and service discovery is provided. The apparatus comprises means for providing for transmission of a request for signed access point information. The request may be provided for transmission prior to authenticating with an access point when authentication is performed or prior to associating with an access point when authentication is not performed. The apparatus of this embodiment further comprises means for receiving a response comprising signed access point information. The apparatus of this embodiment also comprises means for verifying the signed access point information using a digital certificate.

In another example embodiment, a method is provided. The method of this embodiment comprises receiving a request for signed access point information. The request may be received prior to authentication when authentication is performed or prior to association when authentication is not performed. The method of this embodiment further comprises signing the requested access point information. The method of this embodiment also comprises building a response to the request comprising the signed access point information. The method of this embodiment further comprises providing for transmission of the response.

In yet another example embodiment, a method is provided. The method of this embodiment comprises receiving a request for signed access point information. The request may be received prior to authentication when authentication is performed or prior to association when authentication is not performed. The method of this embodiment further comprises providing for transmission of the request to a third party entity. The request may be provided for transmission to the third party entity over a secure connection. The method of this embodiment also comprises receiving a response to the request comprising the signed access point information from the third party entity. The response may be received from the third party entity over a secure connection. The method of this embodiment further comprises providing for transmission of the response.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
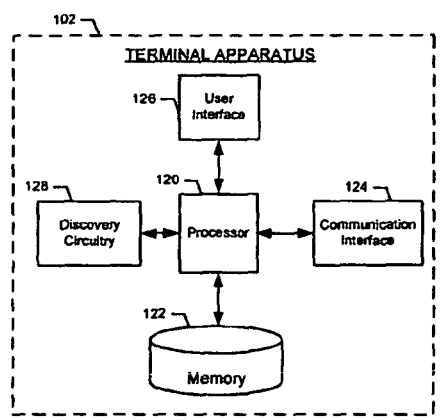
FIG. 1 illustrates a terminal apparatus for performing reliable network, capability, and service discovery according to an example embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a terminal apparatus 102 for performing reliable network, capability, and service discovery according to an example embodiment of the present invention. It will be appreciated that the scope of the invention encompasses many potential embodiments in addition to those illustrated and described herein. As such, while FIG. 1 illustrates one example of a configuration of a terminal apparatus 102 for performing reliable network, capability, and service discovery, numerous other configurations may also be used to implement embodiments of the present invention.

The terminal apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, server, network node, multiple computing devices in communication with each other, any combination thereof, and/or the like. In an example embodiment, the terminal apparatus 102 may be embodied as a mobile terminal, such as that illustrated in FIG. 3.

Figure 3:
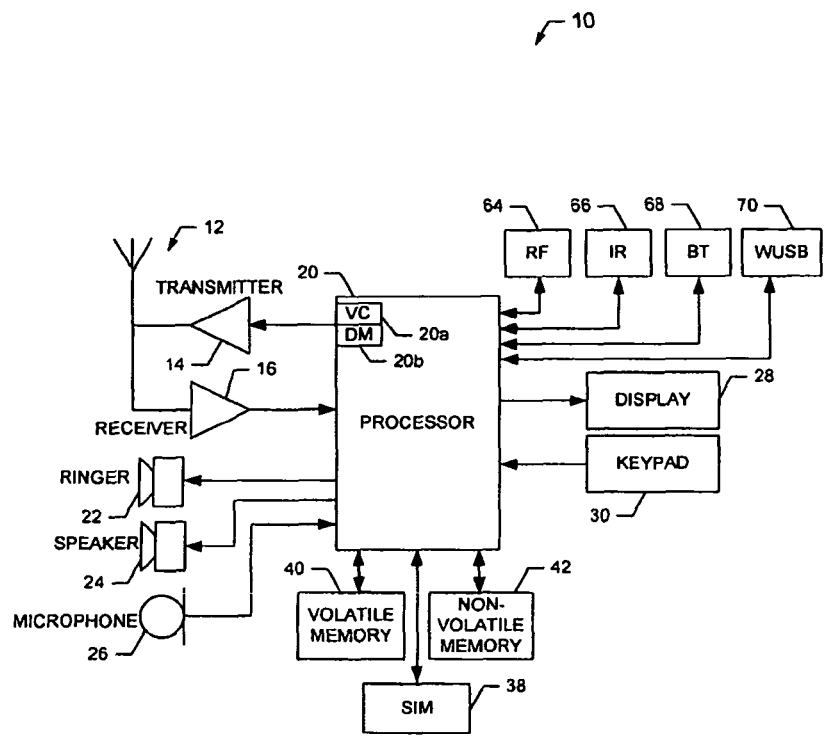
FIG. 3 is a schematic block diagram of a mobile terminal according to an example embodiment of the present invention.

In this regard, FIG. 3 illustrates a block diagram of a mobile terminal 10 representative of one embodiment of a terminal apparatus 102 in accordance with embodiments of the present invention. It should be understood, however, that the mobile terminal 10 illustrated and hereinafter described is merely illustrative of one type of terminal apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and any other type of electronic system, may employ embodiments of the present invention.

As shown, the mobile terminal 10 may include an antenna 12 (or multiple antennas 12) in communication with a transmitter 14 and a receiver 16. The mobile terminal may also include a processor 20 that provides signals to and receives signals from the transmitter and receiver, respectively. These signals may include signaling information in accordance with an air interface standard of an applicable cellular system, and/or any number of different wireline or wireless networking techniques, comprising but not limited to Wi-Fi™, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (Wi-MAX) protocols.

It is understood that the processor 20 may comprise circuitry for implementing audio/video and logic functions of the mobile terminal 10. For example, the processor 20 may be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits, such as, for example, an ASIC (application specific integrated circuit) or FPGA (field programmable gate array), or some combination thereof. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or elements of the user interface, such as, for example, the speaker 24, the ringer 22, the microphone 26, the display 28, and/or the like. The processor 20 and/or user interface circuitry comprising the controller 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a joystick, and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including Wireless Fidelity (Wi-Fi), WLAN techniques such as IEEE 802.11 techniques, IEEE 802.11u techniques, IEEE 802.16 techniques, Wi-Fi Alliance (WFA) techniques, and/or the like.

The mobile terminal 10 may comprise memory, such as one or more subscriber identity modules (SIM) 38, one or more universal subscriber identity modules (USIM), one or more removable user identity modules (R-UIM), and/or the like, which may store information elements related to a mobile subscriber. In addition to the SIM, the mobile terminal 10 may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning now to FIG. 1, in an example embodiment the terminal apparatus 102 includes various means, such as a processor 120, memory 122, communication interface 124, user interface 126, and discovery circuitry 128 for performing the various functions herein described. These means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be embodied on a single computing device or may be distributed across a plurality of computing devices collectively configured to function as the terminal apparatus 102. The plurality of processors may be in operative communication with each other and may be collectively configured to perform one or more functionalities of the terminal apparatus 102 as described herein. In embodiments wherein the terminal apparatus 102 may be embodied as a mobile terminal 10, the processor 120 may be embodied as or comprise the processor 20. In an example embodiment, the processor 120 may be configured to execute instructions stored in the memory 122 or otherwise accessible to the processor 120. These instructions, when executed by the processor 120, may cause the terminal apparatus 102 to perform one or more of the functionalities of the terminal apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 1 as a single memory, the memory 122 may comprise a plurality of memories. The plurality of memories may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 122 may comprise the volatile memory 40 and/or the non-volatile memory 42. The memory 122 may be configured to store information, data, applications, instructions, or the like for enabling the terminal apparatus 102 to carry out various functions in accordance with embodiments of the present invention. For example, in at least some example embodiments, the memory 122 may be configured to buffer input data for processing by the processor 120. Additionally or alternatively, in at least some example embodiments, the memory 122 may be configured to store program instructions for execution by the processor 120. The memory 122 may store information in the form of static and/or dynamic information. This stored information may be stored and/or used by the discovery circuitry 128 during the course of performing their functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to another device, such as, for example, a third party entity (e.g. the third party entity 108 illustrated in FIG. 4), an access point (e.g., the access point 104 illustrated in FIG. 4) and/or the like. In at least one embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with another computing device. The communication interface 124 may be configured to receive and/or transmit data using any protocol that may be used for communications between computing devices. The communication interface 124 may additionally be in communication with the memory 122, user interface 126, and/or discovery circuitry 128, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the terminal apparatus 102 is embodied as a server, aspects of the user interface 126 may be reduced or the user interface 126 may even be eliminated. Alternatively, in embodiments wherein the terminal apparatus 102 is embodied as a server, at least some aspects of the user interface 126 may be embodied on an apparatus used by a user that is in communication with the terminal apparatus 102. The user interface 126 may be in communication with the memory 122, communication interface 124, and/or discovery circuitry 128, such as via a bus.

The discovery circuitry 128 may be embodied as various means, such as circuitry, hardware, a computer program product comprising computer readable program instructions stored on a computer readable medium (e.g., the memory 122) and executed by a processing device (e.g., the processor 120), or some combination thereof and, in one embodiment, may be embodied as or otherwise controlled by the processor 120. In embodiments wherein the discovery circuitry 128 is embodied separately from the processor 120, the discovery circuitry 128 may be in communication with the processor 120. The discovery circuitry 128 may further be in communication with one or more of the memory 122, communication interface 124, or user interface 126, such as via a bus. The discovery circuitry 128 may be configured to perform reliable network, capability, and service discovery, such as to enable a terminal apparatus 102 to request signed identification, capability, and service information from an access point 104 that can be verified as reliable prior to authenticating with the access point 104 when authentication is performed or prior to associating with the access point 104 when authentication is not performed. According to example embodiments, when authentication is performed, the signed identification, capability, and service information may be requested prior to or subsequent to associating with the access point 104.

The discovery circuitry 128 may be configured to perform network discovery to discover one or more access points 104. In some embodiments, the discovery circuitry 128 may be configured to receive a broadcast message comprising identification, capability, and service information for an access point 104. In alternative embodiments, the discovery circuitry 128 may interrogate the access point 104 for identification, capability, and service information. The identification information may comprise a service set identifier (SSID), Media Access Control (MAC) address, Uniform Resource Identifier (URI) for web authentication, or the like. The capability information may comprise a list of capabilities provided by the access point 104 or network, or the like. The service information may comprise a list of services accessible from the access point 104 or the like. During the discovery phase, however, the identification, capability, and service information may not be signed and thus may not be verifiable as reliable identification, capability, and service information by the discovery circuitry 128. Accordingly, the discovery circuitry 128 may provide for transmission of a request for signed identification, capability, and service information to an access point 104. In example embodiments, the request for signed identification information may be a separate request from the request for signed service information and/or request for signed capability information. In some embodiments, the request may be a Generic Advertising Services (GAS) request according to IEEE 802.11u. According to some example embodiments, the request may be a vendor specific attribute according to the Wi-Fi Alliance (WFA).

According to one example embodiment, the request from the discovery circuitry 128 may comprise one or more query information fields and a field indicating the length of the request. Each query information field may contain a query information identifier corresponding to a type of signed identification, capability, or service information that the discovery circuitry 128 is requesting, such as SSID, MAC address, URI, services list, Network Access Identifier (NAI) Realm list, fully qualified domain name (FQDN) list, network capability list, access point capability list or the like. A services list may comprise a list of services hosted locally on the access point 104, such as, for example, printing when the printer is also an access point 104; a list of services for which access is provided by the network 110 to which the access point 104 belongs; or a list of services provided by a third party entity 108 to which the access point 104 gives direct access, such as, for example, an entity in a private network. A network capability list may comprise a list of the capabilities the network may provide the terminal device 102. An access point capability list may provide a list of the capabilities the access point 104 may provide the terminal device 102. According to certain embodiments, the request may not require query information fields if the signed identification, capability, and service information to be provided has been predetermined. In some embodiments, the discovery circuitry 128 may request a digital certificate of the access point 104 via a query information field or via a separate field in the request. Since the request may be sent when data transmission is not protected during the discovery phase, such as prior to authenticating with the access point 104 when authentication is performed or prior to associating with the access point 104 when authentication is not performed, some embodiments of the request may also comprise a random number or nonce field. The discovery circuitry 128 may generate a random or pseudo-random number and include it in the random number field of the request. The random number may be replicated in a signed response to the request to prevent attacks such as replay attacks and man-in-the-middle attacks.

The discovery circuitry 128 may further be configured to receive a response to the request from an access point 104. In an example embodiment, the response may be a GAS response according to IEEE 802.11u. In some embodiments, the response may be a vendor specific attribute according to WFA. According to example embodiments, the response may comprise one or more response information fields and a field indicating the length of the response. Each response information field itself may comprise a field containing the requested data, a field containing an identifier corresponding to the query information identifier for the requested data, a field containing a signature, and a field indicating the length of the response information field. In one example embodiment, each response information field contains a field for the random number contained in the request. Alternatively, in some embodiments, the random number may be appended to the requested data. Since the information contained in the request and response is not necessarily private, the communication between the access point 104 and discovery circuitry 128 need be only reliable, not necessarily encrypted.

According to example embodiments, one of the response information fields may contain a digital certificate for the access point 104. In alternative embodiments, the digital certificate of the access point 104 may be received separately from or appended to the response. An example digital certificate for an access point 104 may comprise an identity of the issuer of the digital certificate, an identity of the access point 104, beginning and ending dates of validity for the digital certificate, the public key of the access point 104, and a signature of the issuer. Accordingly, in some embodiments, the response information field containing the digital certificate may not require the signature field since the digital certificate may already contain the signature of the issuer of the digital certificate.

The discovery circuitry 128 may be configured to utilize the data in the response to reliably verify the signed identification, capability, and service information of the access point 104. In example embodiments, the discovery circuitry 128 may use the digital certificate of the access point 104 received in the response for verification. In this regard, the discovery circuitry 128 may first verify the digital certificate of the access point 104. Then, the discovery circuitry 128 may use the trusted digital certificate of the access point to verify the information provided in the response information fields of the response.

According to example embodiments, the discovery circuitry 128 may verify the digital certificate of the access point 104 by verifying the signature of the issuer contained in the digital certificate of the access point 104. The discovery circuitry 128 may use the digital certificate of the issuer to verify the signature of the issuer. In certain embodiments, the discovery circuitry 128 may already have access to the digital certificate of the issuer. For example, the discovery circuitry 128 may have previously accessed and verified the digital certificate of the issuer. Once the signature of the issuer is verified, the discovery circuitry 128 may trust the issuer and, therefore, may trust the digital certificate of the access point 104 signed by the issuer. if the discovery circuitry 128 does not trust the issuer, the discovery circuitry 128 may access the digital certificate of the issuer and verify the signature of the issuer of that certificate. The discovery circuitry 128 may continue to iteratively verify the signature of the issuer of each certificate in the chain of digital certificates until the discovery circuitry 128 trusts at least one of the issuers. Once the discovery circuitry 128 trusts at least one of the issuers in the chain of digital certificates, the discovery circuitry 128 may trust the digital certificate of the access point 104.

In various example embodiments, a Public Key Infrastructure (PKI) may be used to issue, sign, and verify the digital certificates. In this regard, the issuer of a digital certificate may sign the digital certificate issued to the recipient (e.g. an access point 104) with the private key of the issuer. The discovery circuitry 128 may obtain the corresponding public key of the issuer. According to an example embodiment, the discovery circuitry 128 may obtain the public key of the issuer from the digital certificate of the issuer. The discovery circuitry 128 may further apply the public key of the issuer to the signature of the issuer in the digital certificate of the recipient to verify that the issuer, in fact, signed the digital certificate of the recipient. The discovery circuitry 128 may then trust the digital certificate of the recipient.

According to alternative embodiments, the discovery circuitry 128 may already have access to a trusted copy of the digital certificate of the access point 104. Accordingly, in certain embodiments, the discovery circuitry 128 may trust the digital certificate of the access point 104 without any further verification of the signature of the issuer.

The discovery circuitry 128 may be further configured to verify the requested data contained in the response information fields of the response. In this regard, the discovery circuitry 128 may obtain the public key of the access point 104 from the verified digital certificate of the access point 104. In an example embodiment, the discovery circuitry 128 may apply the public key of the access point 104 to the signature contained in the signature field of the response information field. Accordingly, the discovery circuitry 128 may verify that the information contained in the requested data field was signed by the access point 104 using the private key of the access point 104. Once the information contained in the requested data fields are verified, the discovery circuitry 128 may rely on the information to identify the access point 104 and list of services and/or capabilities accessible from the access point 104. The discovery circuitry 128 may then select the access point 104 for communication.

In alternative embodiments, the access point 104 may not provide the digital certificate of the access point 104 in the response to the discovery circuitry 128. According to certain embodiments, as described above, the discovery circuitry 128 may already have access to the digital certificate of the access point 104. For example, the discovery circuitry 128 may have previously obtained a copy of the digital certificate of the access point 104. In this regard, the discovery circuitry 128 may or may not have already verified the previously obtained digital certificate of the access point 104. In other example embodiments, the discovery circuitry 128 may have access to a network connection that may be used to obtain a copy of the digital certificate of the access point 104. For example, the discovery circuitry 128 may have access to a separate 3G connection. In another example, the discovery circuitry 128 may have access to a network connection via another access point 104 while attempting to discover a new access point 104.

According to various alternative embodiments, the access point 104 may not have a digital certificate. In this regard, the response may be signed by a different reliable source. In example embodiments, the response may be signed by a third party entity 108. In some embodiments, the response signed by the third party entity 108 may comprise the random number sent by the discovery circuitry 128. According to various embodiments, the third party entity 108 may comprise a server of the network operator to which the access point 104 belongs. In alternative embodiments, the third party entity 108 that signs the response may also comprise a certificate authority (CA), a manufacturer of the access point 104, a company providing network access via the access point 104, or the like. In these embodiments, the discovery circuitry 128 may verify the signature and digital certificate of the reliable source, as described above with respect to the access point 104.

Figure 2:
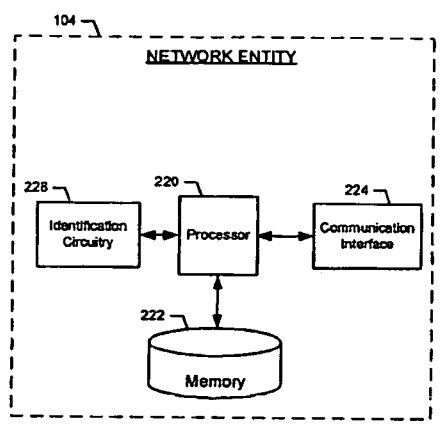
FIG. 2 illustrates an access point for performing reliable network, capability, and service discovery according to an example embodiment of the present invention.

Referring now to FIG. 2, the access point 104 may comprise any computing device, mobile or fixed, and may be embodied as a server, desktop computer, laptop computer, mobile terminal 10, and/or the like configured to provide network side services, such as providing network access to a terminal apparatus 102. The access point may also be embodied as a combination of a plurality of computing devices configured to provide network side services, such as providing network access to a terminal apparatus 102. In this regard, the access point 104 may be embodied, for example, as a server cluster and/or may be embodied as a distributed computing system, which may be distributed across a plurality of computing devices, such as, for example, mobile terminals 10. In one embodiment, the access point 104 may be embodied as a wireless access point (WAP) of a service provider or network operator that allows a terminal apparatus 102 to connect to a wireless network, for example via Wi-Fi. In certain embodiments, the access point 104 may be located a single hop from the terminal apparatus 102.

In an example embodiment the access point 104 includes various means, such as a processor 220, memory 222, communication interface 224, and identification circuitry 228 for performing the various functions herein described. These means of the access point 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 222) that is executable by a suitably configured processing device (e.g., the processor 220), or some combination thereof.

The processor 220 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 220 comprises a plurality of processors. The plurality of processors may be embodied on a single computing device or may be distributed across a plurality of computing devices collectively configured to function as the access point 104. The plurality of processors may be in operative communication with each other and may be collectively configured to perform one or more functionalities of the access point 104 as described herein. In embodiments wherein the access point 104 is embodied as a mobile terminal 10, the processor 120 may be embodied as or comprise the controller 20. In an example embodiment, the processor 220 may be configured to execute instructions stored in the memory 222 or otherwise accessible to the processor 220. These instructions, when executed by the processor 220, may cause the access point 104 to perform one or more of the functionalities of the access point 104 as described herein. As such, whether configured by hardware or software methods, or by a combination thereof, the processor 220 may comprise an entity capable of performing operations according to embodiments of the present invention while configured accordingly. Thus, for example, when the processor 220 is embodied as an ASIC, FPGA or the like, the processor 220 may comprise specifically configured hardware for conducting one or more operations described herein. Alternatively, as another example, when the processor 220 is embodied as an executor of instructions, such as may be stored in the memory 222, the instructions may specifically configure the processor 220 to perform one or more algorithms and operations described herein.

The memory 222 may include, for example, volatile and/or non-volatile memory. Although illustrated in FIG. 2 as a single memory, the memory 222 may comprise a plurality of memories. The plurality of memories may be embodied on a single computing device or distributed across a plurality of computing devices. The memory 222 may comprise volatile memory, non-volatile memory, or some combination thereof In this regard, the memory 222 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the access point 104 is embodied as a mobile terminal 10, the memory 222 may comprise the volatile memory 40 and/or the non-volatile memory 42. The memory 222 may be configured to store information, data, applications, instructions, or the like for enabling the access point 104 to carry out various functions in accordance with example embodiments of the present invention. For example, in at least some embodiments, the memory 222 may be configured to buffer input data for processing by the processor 220. Additionally or alternatively, in at least some embodiments, the memory 222 may be configured to store program instructions for execution by the processor 220. The memory 222 may store information in the form of static and/or dynamic information. This stored information may be stored and/or used by the identification circuitry 228 during the course of performing their functionalities.

The communication interface 224 may be embodied as any device or means embodied in circuitry, hardware, a computer program product comprising computer readable program instructions stored on a computer readable medium (e.g., the memory 222) and executed by a processing device (e.g., the processor 220), or a combination thereof that may be configured to receive and/or transmit data from/to another device, such as, for example, a third party entity (e.g., the third party entity 108 illustrated in FIG. 4), a terminal apparatus (e.g., the terminal apparatus 102 illustrated in FIG. 4), and/or the like. In at least one embodiment, the communication interface 224 may be at least partially embodied as or otherwise controlled by the processor 220. In this regard, the communication interface 224 may be in communication with the processor 220, such as via a bus. The communication interface 224 may include, for example, an antenna, a transmitter, a receiver, a transceiver and/or supporting hardware or software for enabling communications with another computing device. The communication interface 224 may be configured to receive and/or transmit data using any protocol that may be used for communications between computing devices. The communication interface 224 may additionally be in communication with the memory 222 and/or identification circuitry 228, such as via a bus.

The identification circuitry 228 may be embodied as various means, such as circuitry, hardware, a computer program product comprising computer readable program instructions stored on a computer readable medium (e.g., the memory 222) and executed by a processing device (e.g., the processor 220), or some combination thereof and, in one embodiment, may be embodied as or otherwise controlled by the processor 220. In embodiments wherein the identification circuitry 228 is embodied separately from the processor 220, the identification circuitry 228 may be in communication with the processor 220. The identification circuitry 228 may further be in communication with one or more of the memory 222 or communication interface 224 such as via a bus. The identification circuitry 228 may be configured to provide signed identification, capability, and service information, such as to enable a terminal apparatus 102 to verify identification, capability, and service information from an access point 104 as reliable. In some example embodiments, the identification circuitry 228 may be configured to provide signed identification, capability, and service information prior to the terminal apparatus 102 authenticating with the access point 104 when authentication is performed or prior to the terminal apparatus 102 associating with the access point 104 when authentication is not performed. According to example embodiments, when authentication is performed, the signed identification, capability, and service information may be provided prior to or subsequent to the terminal apparatus 102 associating with the access point 104.

The identification circuitry 228 may be configured to provide for the broadcast of the identity of the access point 104. In example embodiments, the identity of the access point 104 may comprise a service set identifier (SSID), Media Access Control (MAC) address, Uniform Resource Identifier (URI) for web authentication, or the like. Additionally, the identification circuitry 228 may be configured to provide for the broadcast of a list of services accessible from the access point 104.

According to various embodiments, the identification circuitry 228 may be further configured to receive a request for signed identification, capability, and service information from a terminal apparatus 102. The request may be in the form of an 802.11u GAS request, a vendor specific attribute according to WFA, or the like. In an example embodiment, the request may comprise one or more query information fields, each comprising an indication of the type of identification, capability, or service information requested. In an alternative embodiment, the request may not comprise any query information fields if the signed identification, capability, and service information to be provided is predetermined. According to certain embodiments, a request for signed identification information may be separate from a request for signed service information and/or request for signed capability information.

The identification circuitry 228 may be further configured to build a response to the request from the terminal apparatus 102. In example embodiments, the identification circuitry 228 may be configured to build one or more response information fields corresponding to the one or more query information fields. Alternatively, the one or more response information fields may correspond to the predetermined signed identification, capability, and service information to be provided. Each response information field may comprise a field containing the requested data, a field containing an identifier corresponding to the query information identifier for the requested data, a field containing a signature, and a field indicating the length of the response information field. In certain embodiments, each response information field additionally contains a field for the random number contained in the request. Alternatively, in some embodiments, the random number may be appended to the requested data. According to various example embodiments, the identification circuitry 228 may sign the requested data and include the signature in the signature field of the response information field. The identification circuitry 228 may be configured to build a response comprising the one or more response information fields and a field indicating the length of the response.

According to example embodiments, the access point 104 may have been issued a digital certificate. The digital certificate of the access point 104 may comprise a public key of the access point 104 and a signature of the issuer of the digital certificate. The identification circuitry 228 may be configured to sign each piece of requested data using a private key corresponding to the public key in the digital certificate of the access point 104. In certain embodiments, the identification circuitry 228 may additionally or alternatively sign the response with the private key. In this regard, the response may comprise an additional field containing the signature of the response. In various embodiments, the information signed by the identification circuitry 228 may include the random number provided in the request.

The digital certificate of the access point 104 may be issued and signed by a third party entity 108. In one embodiment, the third party entity 108 may comprise a CA that issues and signs the digital certificate of the access point 104. A terminal apparatus 102 may determine that the CA is reliable and, therefore, trust the digital certificate. In certain embodiments, the terminal apparatus 102 may have already verified the CA prior to receiving the response from the identification circuitry 228. According to an example embodiment, the CA may have its own digital certificate that has been verified by the terminal apparatus 102. In example embodiments, the digital certificate of the CA may be preconfigured in the terminal apparatus 102 and deemed trusted.

In alternative embodiments, the third party entity 108 may comprise a server of a network operator to which the access point 104 belongs. In this regard, the network operator may have its own digital certificate that can be verified by the terminal apparatus 102. In an example embodiment, a terminal apparatus 102 may verify the issuer of the digital certificate of the network operator if it does not trust the digital certificate of the network operator. According to an alternative embodiment, the third party entity 108 may belong to a company that provides an internet connection via the access point 104. Similar to the embodiments where the third party entity 108 comprises a server of a network operator, the company may have its own digital certificate that can be verified by the terminal apparatus 102.

In yet another alternative embodiment, the manufacturer of the access point 104 may issue and sign the digital certificate of the access point 104. In this regard, the manufacturer may sign various identification, capability, and/or service information related to the access point 104. For example, the manufacturer may sign the SSID or MAC address of the access point 104 so that it cannot be modified without the approval of the manufacturer. In the event that the signed identification, capability, and/or service information is modified, the manufacturer will have to resign the new identification, capability, and/or service information. The manufacturer may have its own digital certificate that can be verified by the terminal apparatus 102. In example embodiments, the digital certificate of the manufacturer may be preconfigured in the terminal apparatus 102 and deemed trusted.

Regardless of the issuer of the digital certificate of the access point 104, a terminal apparatus 102 may verify the issuer of the digital certificate of the access point 104. In example embodiments, if the terminal apparatus 102 does not trust the issuer of the digital certificate of the access point 104, the terminal apparatus 102 may verify the digital certificate of the issuer. The terminal apparatus 102 may continue iteratively verifying the issuers of the digital certificates until an issuer may be trusted. As long as a chain of digital certificates exists from the trusted issuer to the access point 104, the terminal apparatus 102 may trust the digital certificate of the access point 104.

According to various example embodiments, the access point 104 may not have a digital certificate. For example, the operational costs of issuing and maintaining digital certificates for access points 104 may be prohibitive. In these embodiments, the identification circuitry 228 may be configured to forward the request from the terminal apparatus 102 to a third party entity 108. The identification circuitry 228 may also forward the random number included in the request. In example embodiments, the identification circuitry 228 may be configured to provide for secure communication with the third party entity 108. In this respect, the identification circuitry 228 may have a predefined security association with the third party entity 108.

In certain embodiments, the third party entity 108 may possess the identification, capability, and service information related to the access point 104 requested by the terminal apparatus 102. In this regard, the third party entity 108 may have authority to sign identification, capability, and service information related to the access point 104 on behalf of the access point 104. Accordingly, the third party entity 108 may generate and sign the response as described above with respect to the identification circuitry 228. In certain embodiments, the third party entity may refuse to sign the identification, capability, and service information related to an access point 104, if the requesting access point 104 differs from the access point 104 for which the information is requested. The third party entity 108 may provide for transmission of the signed response back to the identification circuitry 228. In certain embodiments, the signed response may comprise the digital certificate of the third party entity 108. The identification circuitry 228 may then provide for transmission of the signed response to the terminal apparatus 102. In this regard, the terminal apparatus 102 may verify the digital certificate of the third party entity 108 as described above with respect to the access point 104.

Figure 4:
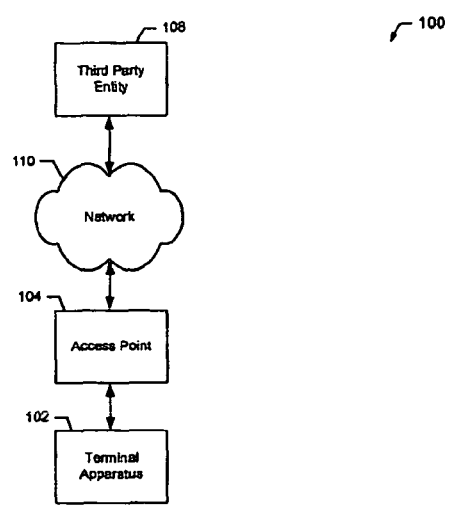
FIG. 4 illustrates a block diagram of an example system for performing reliable network, capability, and service discovery according to an example embodiment of the present invention.

FIG. 4 illustrates a block diagram of a system 100 for performing reliable network, capability, and service discovery according to an example embodiment of the present invention. It will be appreciated that the scope of the invention encompasses many potential embodiments in addition to those illustrated and described herein. As such, while FIG. 4 illustrates one example of a configuration of a system for performing reliable network, capability, and service discovery, numerous other configurations may also be used to implement embodiments of the present invention.

In at least some embodiments, the system 100 includes an access point 104, terminal apparatus 102, and a third party entity 108. In at least some embodiments, the system 100 further comprises a network 110. The network 110 may comprise one or more wireline networks, one or more wireless networks (e.g., a cellular network, wireless local area network, wireless personal area network, wireless metropolitan area network, and/or the like), or some combination thereof, and in some embodiments comprises the internet. In one embodiment, the network 110 comprises a public and mobile network (e.g., a cellular network), such as may be implemented by a network operator (e.g. a cellular access provider). The network 110 may operate as a private data network; a public data network such as, for example, the Internet; a GPRS network; a CDMA core network; a WIMAX network, and/or the like. It will be appreciated, however, that where references herein are made to a network standard and/or terminology particular to a network standard, the references are provided merely by way of example and not by way of limitation. Additionally, although the system 100 illustrates a single terminal apparatus 102, a single access point 104, and a single third party entity 108 for purposes of example, the system 100 may include a plurality of terminal apparatuses 102, access points 104, and/or third party entities 108.

The third party entity 108 may comprise any computing device, mobile or fixed, and may be embodied as a database, server, desktop computer, laptop computer, mobile terminal 10, and/or the like configured to provide network side services, such as providing network access to a terminal apparatus 102. The third party entity 108 may also be embodied as a combination of a plurality of computing devices configured to provide network side services, such as providing network access to a terminal apparatus 102. In this regard, the third party entity 108 may be embodied, for example, as a server cluster and/or may be embodied as a distributed computing system, which may be distributed across a plurality of computing devices, such as, for example, mobile terminals 10. In one embodiment, the third party entity 108 may be embodied as a server of a network operator, or the like. Although the third party entity 108 is shown in FIG. 4 as being connected to the access point 104 via a network 110, in some embodiments, the third party entity 108 may be directly connected to the access point 104.

The access point 104 may comprise any computing device, mobile or fixed, and may be embodied as a server, desktop computer, laptop computer, mobile terminal 10, WAP, and/or the like configured to provide network side services, such as providing network access to a terminal apparatus 102. The access point 104 may also be embodied as a combination of a plurality of computing devices configured to provide network side services, such as providing network access to a terminal apparatus 102. In this regard, the access point 104 may be embodied, for example, as a server cluster and/or may be embodied as a distributed computing system, which may be distributed across a plurality of computing devices, such as, for example, mobile terminals 10. In one embodiment, the access point 104 may be embodied as a WAP, or the like. In some embodiments, the access point 104 may be located a single hop from the terminal apparatus 102.

The terminal apparatus 102 may comprise any device configured to request signed identification, capability, and service information from an access point 104 and verify the information received in response to ensure reliable selection of the access point 104 during network discovery. In this regard, the terminal apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In an example embodiment, the terminal apparatus 102 may be embodied as a mobile terminal 10, such as that illustrated in FIG. 3.

Figure 5:
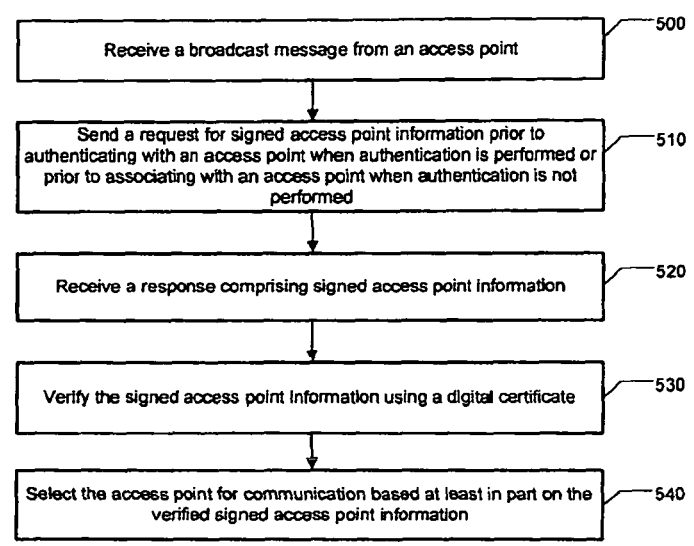
FIG. 5 illustrates a flowchart according to an example method performing reliable network, capability, and service discovery according to an example embodiment of the invention.

FIG. 5 illustrates a flowchart according to an example method for performing reliable network, capability, and service discovery according to an example embodiment of the invention. In this regard, FIG. 5 illustrates operations that may be performed by the discovery circuitry 128. The method may comprise receiving a broadcast message from an access point, at operation 500. It will be appreciated, however, that operation 500 is not a prerequisite to operation 510. In this regard, the terminal apparatus 102 may interrogate an access point without receiving a broadcast message. The method may then comprise sending a request for signed access point information prior to authenticating with an access point when authentication is performed or prior to associating with an access point when authentication is not performed, at operation 510. Operation 520 may comprise receiving a response comprising signed access point information. The method may then comprise verifying the signed access point information using a digital certificate, at operation 530. According to another example embodiment of the invention, the method may optionally continue at operation 540. Operation 540 may comprise selecting the access point for communication based at least in part on the verified signed access point information.

Figure 6:
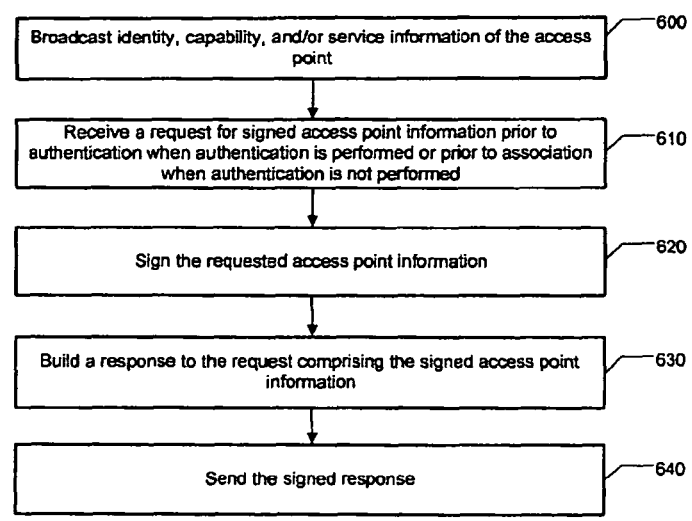
FIG. 6 illustrates a flowchart according to an example method performing reliable network, capability, and service discovery according to an example embodiment of the invention.
Figure 7:
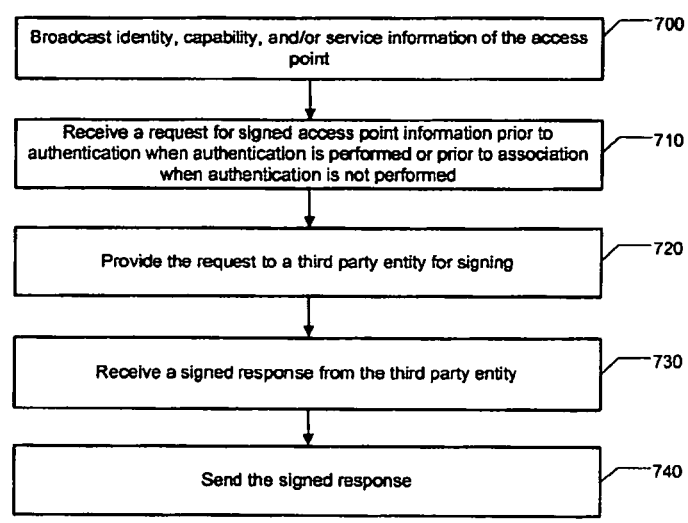
FIG. 7 illustrates a flowchart according to an example method performing reliable network, capability, and service discovery according to an example embodiment of the invention.

FIG. 6 illustrates a flowchart according to an example method for performing reliable network, capability, and service discovery according to an example embodiment of the invention. In this regard, FIG. 7 illustrates operations that may be performed by the identification circuitry 228. The method may comprise broadcasting identity, capability, and/or service information of the access point, at operation 600. It will be appreciated, however, that operation 600 is not a prerequisite to operation 610. In this regard, the identification circuitry 228 may receive a request for signed access point information without broadcasting a message. The method may then comprise receiving a request for signed access point information prior to authentication when authentication is performed or prior to association when authentication is not performed, at operation 610. Operation 620 may comprise signing the requested access point information. The method may then comprise building a response to the request comprising the signed access point information, at operation 630. Operation 640 may comprise sending the signed response.

FIG. 7 illustrates a flowchart according to an example method for performing reliable network, capability, and service discovery according to an example embodiment of the invention. In this regard, FIG. 7 illustrates operations that may be performed by the identification circuitry 228. The method may comprise broadcasting identity, capability, and/or service information of the access point, at operation 700. It will be appreciated, however, that operation 700 is not a prerequisite to operation 710. In this regard, the identification circuitry 228 may receive a request for signed access point information without broadcasting a message. The method may then comprise receiving a request for signed access point information prior to authentication when authentication is performed or prior to association when authentication is not performed, at operation 710. Operation 720 may comprise providing the request to a third party entity for signing. The method may then comprise receiving a signed response from the third party entity, at operation 730. Operation 740 may comprise sending the signed response.

FIGS. 5-7 are flowcharts of a system, method, and computer program product according to example embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) that embodies the procedures described herein may be stored by one or more memory devices of a mobile terminal, server, or other computing device (e.g., the terminal apparatus 102 or access point 104) and executed by a processor (e.g., the processor 120 or 220) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Embodiments of the invention provide for performing reliable network, capability, and service discovery. Various embodiments of the invention allow a mobile device to reliably identify an access point prior to authenticating with the access point when authentication is performed or prior to associating with the access point when authentication is not performed. In this regard, a mobile device may avoid selecting a rogue or fraudulent access point in certain embodiments, thus avoiding exposure to malicious attacks by the rogue or fraudulent access points. Additionally, in example embodiments, a mobile device may eliminate the unnecessary repetition of the time-consuming authentication process.

The following provides additional example embodiments of the present invention. One example method in accordance with the invention comprises providing for transmission of a request for signed access point information, wherein the request may be provided for transmission prior to authenticating with an access point when authentication is performed or prior to associating with an access point when authentication is not performed; receiving a response comprising signed access point information; and verifying the signed access point information using a digital certificate. According to some example embodiments, verifying the signed access point information may include verifying a signature of an issuer of the digital certificate and using information in the digital certificate to verify the signed access point information. Further, according to certain embodiments, verifying the signed access point information may include verifying the signed access point information using a Public Key Infrastructure (PKI). According to example embodiments, the request may comprise a random number, and the response may comprise the random number of the request. In some example embodiments, the method may comprise selecting the access point for communication based in least in part on the verified signed access point information. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, Network Access Identifier (NAI) Realm list, or fully qualified domain name (FQDN) list.

A related example apparatus for performing reliable network, capability, and service discovery comprises at least one processor and at least one memory including computer program code, the at least one memory and the computer program code configured to, with the at least one processor, cause the apparatus at least to perform various functionalities. In this regard, the example apparatus is caused to perform providing for transmission of a request for signed access point information, wherein the request may be provided for transmission prior to authenticating with an access point when authentication is performed or prior to associating with an access point when authentication is not performed; receiving a response comprising signed access point information; and verifying the signed access point information using a digital certificate. According to some example embodiments, verifying the signed access point information may include verifying a signature of an issuer of the digital certificate and using information in the digital certificate to verify the signed access point information. Further, according to certain embodiments, verifying the signed access point information may include verifying the signed access point information using a Public Key Infrastructure (PKI). According to example embodiments, the request may comprise a random number, and the response may comprise the random number of the request. In some example embodiments, the example apparatus is further caused to perform selecting the access point for communication based in least in part on the verified signed access point information. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, Network Access Identifier (NAI) Realm list, or fully qualified domain name (FQDN) list.

Another example embodiment is an example computer-readable storage medium having executable computer-readable program code instructions stored therein. The computer-readable program code instructions of the example computer-readable storage medium are for causing an apparatus to perform various functionalities. In this regard, the example apparatus is caused to perform providing for transmission of a request for signed access point information, wherein the request may be provided for transmission prior to authenticating with an access point when authentication is performed or prior to associating with an access point when authentication is not performed; receiving a response comprising signed access point information; and verifying the signed access point information using a digital certificate. According to some example embodiments, verifying the signed access point information may include verifying a signature of an issuer of the digital certificate and using information in the digital certificate to verify the signed access point information. Further, according to certain embodiments, verifying the signed access point information may include verifying the signed access point information using a Public Key Infrastructure (PKI). According to example embodiments, the request may comprise a random number, and the response may comprise the random number of the request. In some example embodiments, the example apparatus is further caused to perform selecting the access point for communication based in least in part on the verified signed access point information. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, Network Access Identifier (NAI) Realm list, or fully qualified domain name (FQDN) list.

Another example embodiment is an example apparatus for performing reliable network, capability, and service discovery. The example apparatus comprises means for providing for transmission of a request for signed access point information, wherein the request may be provided for transmission prior to authenticating with an access point when authentication is performed or prior to associating with an access point when authentication is not performed; means for receiving a response comprising signed access point information; and means for verifying the signed access point information using a digital certificate. According to some example embodiments, verifying the signed access point information may include verifying a signature of an issuer of the digital certificate and using information in the digital certificate to verify the signed access point information. Further, according to certain embodiments, verifying the signed access point information may include verifying the signed access point information using a Public Key Infrastructure (PKI). According to example embodiments, the request may comprise a random number, and the response may comprise the random number of the request. In some example embodiments, the example apparatus further comprises means for selecting the access point for communication based in least in part on the verified signed access point information. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, Network Access Identifier (NAI) Realm list, or fully qualified domain name (FQDN) list.

In another example embodiment, a system is provided that comprises one or more access points configured to provide access to one or more networks and a mobile device configured to request signed access point information from the one or more access points; receive a response comprising signed access point information from the one or more access points; and verify the signed access point information using a digital certificate. According to this example embodiment, the signed access point information may be requested prior to authenticating with an access point when authentication is performed or prior to associating with an access point when authentication is not performed. According to some example embodiments, the system may further comprise one or more third party entities configured to issue and sign digital certificates. In some example embodiments, the digital certificate may be signed by one of the one or more third party entities, and the mobile device may be further configured to verify the signed access point information by verifying the signature of the one of the one or more third party entities and using information in the digital certificate to verify the signed access point information. According to example embodiments, at least one of the one or more third party entities comprises a certificate authority (CA) or a server of a network operator to which at least one of the one or more access points belong. In some example embodiments, at least one of the one or more third party entities may be further configured to receive the request from at least one of the one or more access points over a secure connection; sign the access point information for the at least one of the one or more access points; and provide for transmission of the signed access point information to the at least one of the one or more access points over the secure connection.

Another example method for performing reliable network, capability, and service discovery comprises receiving a request for signed access point information, wherein the request is received prior to authentication when authentication is performed or prior to association when authentication is not performed; signing the requested access point information; building a response to the request comprising the signed access point information; and providing for transmission of the response. According to example embodiments, the request may comprise a random number, and the response may comprise the random number of the request. According to some example embodiments, signing the requested access point information may include signing the requested access point information using information in a digital certificate. Further, according to example embodiments, the digital certificate may be issued and signed by a third party entity. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, network capability list, access point capability list, Network Access Identifier (NAI) Realm list, or fully qualified domain name (FQDN) list.

Another example method for performing reliable network, capability, and service discovery comprises receiving a request for signed access point information, wherein the request is received prior to authentication when authentication is performed or prior to association when authentication is not performed; providing for transmission of the request to a third party entity over a secure connection; receiving a response to the request from the third party entity over the secure connection comprising the signed access point information; and providing for transmission of the response. According to example embodiments, the request may comprise a random number, and the response may comprise the random number of the request. According to various embodiments, providing for transmission of the request to the third party entity comprises providing the random number to the third party entity, and receiving a response to the request from the third party entity comprises receiving a response comprising the random number of the request. According to some example embodiments, the requested access point information may be signed using information in a digital certificate of the third party entity. Further, according to example embodiments, the secure connection may be a predefined security association. According to some example embodiments, the request for signed access point information may comprise one or more identifiers, and each of the one or more identifiers may correspond to a type of requested access point information. Further, the access point information may comprise at least one of a service set identifier (SSID), Media Access Control (MAC) address, Uniform Resource Identifier (URI), services list, Network Access Identifier (NAI) Realm list, network capability list, access point capability list, or fully qualified domain name (FQDN) list.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method for performing network, capability, and service discovery, the method comprising:
providing, when an authentication is to be performed, for transmission of a request for signed access point information, wherein the request is provided, by a user equipment, for transmission prior to the authentication with an access point;
providing, when the authentication is not to be performed, for transmission of the request for the signed access point information, wherein the request is provided, by the user equipment, prior to associating with the access point, wherein the signed access point information includes at least one of a service set identifier, a media access control address, a uniform resource identifier, a services list, a network access identifier realm list, or a fully qualified domain name list, the request for the signed access point information including a random number and at least a vendor specific attribute according to the standard of Wi-Fi Alliance;
receiving, by the user equipment, a response comprising the signed access point information, the response being received in response to the request and including a signed identification, a signed capability, and a signed service information of the access point, the random number of the request, and at least the vendor specific attribute according to the standard of Wi-Fi Alliance for verification prior to authentication with the access point when authentication is performed or prior to associating with the access point when authentication is not performed; and verifying, by the user equipment, the signed access point information using a digital certificate.

2. The method of claim 1, wherein the request for the signed access point information comprises one or more identifiers, and wherein each of the one or more identifiers corresponds to a type of requested access point information.

3. The method of claim 1, wherein the verifying the signed access point information further comprises:

verifying a signature of an issuer of the digital certificate; and using information in the digital certificate to verify the signed access point information.

4. The method of claim 1, further comprising:

selecting an access point for communication based at least in part on the verified signed access point information.

5. An apparatus comprising:

at least one processor; and at least one memory including computer program code, the at least one memory and the computer program code configured to, with the at least one processor, cause the apparatus to perform at least the following:

provide, when an authentication is to be performed, for transmission of a request for signed access point information, wherein the request is provided, by a user equipment, for transmission prior to the authentication with an access point;

provide, when the authentication is not to be performed, for transmission of the request for the signed access point information, wherein the request is provided, by the user equipment, prior to associating with the access point, wherein the signed access point information comprises at least one of a service set identifier, media access control address, uniform resource identifier, services list, network access identifier realm list, or fully qualified domain name list, the request for the signed access point information including a random number and at least a vendor specific attribute according to the standard of Wi-Fi Alliance;

receive, by the user equipment, a response comprising the signed access point information, the response being received in response to the request and including a signed identification, a signed capability, and a signed service information of the access point, the random number of the request, and at least the vendor specific attribute according to the standard of Wi-Fi Alliance for verification prior to authentication with the access point when authentication is performed or prior to associating with the access point when authentication is not performed; and verify, by the user equipment, the signed access point information using a digital certificate.

6. The apparatus of claim 5, wherein the request for the signed access point information comprises one or more identifiers, and wherein each of the one or more identifiers corresponds to a type of requested access point information.

7. The apparatus of claim 5, wherein in order to verify the signed access point information, the at least one memory and the computer program code are further configured to, with the at least one processor, cause the apparatus to:

verify a signature of an issuer of the digital certificate; and
use information in the digital certificate to verify the signed access point information.

8. The apparatus of claim 5, wherein in order to verify the signed access point information, the at least one memory and the computer program code are further configured to, with the at least one processor, cause the apparatus to:

verify the signed access point information using a public key infrastructure.

9. The apparatus of claim 5, wherein the at least one memory and the computer program code are further configured to, with the at least one processor, cause the apparatus to:

select an access point for communication based at least in part on the verified signed access point information.

10. A non-transitory computer-readable storage medium including computer-readable program code, which when executed by at least one processor provides operations comprising:

providing, when an authentication is to be performed, for transmission of a request for signed access point information, wherein the request is provided, by a user equipment, for transmission prior to the authentication with an access point;

providing, when the authentication is not to be performed, for transmission of the request for the signed access point information, wherein the request is provided, by the user equipment, prior to associating with the access point, wherein the signed access point information includes at least one of a service set identifier, a media access control address, a uniform resource identifier, a services list, a network access identifier realm list, or a fully qualified domain name list, the request for the signed access point information including a random number and at least a vendor specific attribute according to the standard of Wi-Fi Alliance;

receiving, by the user equipment, a response comprising the signed access point information, the response being received in response to the request and including a signed identification, a signed capability, a signed service information of the access point, the random number of the request, and at least the vendor specific attribute according to the standard of Wi-Fi Alliance for verification prior to authentication with the access point when authentication is performed or prior to associating with the access point when authentication is not performed; and verifying, by the user equipment, the signed access point information using a digital certificate.

11. An apparatus comprising:

at least one processor; and at least one memory including computer program code, the at least one memory and the computer program code configured to, with the at least one processor, cause the apparatus to perform at least the following:

receive, when an authentication is to be performed, a request for signed access point information, wherein the request is received, by an access point, prior to authentication; receive, when the authentication is not to be performed, the request for the signed access point information, wherein the request is received, by the access point, prior to association, wherein the signed access point information comprises at least one of a service set identifier, media access control address, uniform resource identifier, services list, network access identifier realm list, or fully qualified domain name list, the request for the signed access point information including a random number and at least a vendor specific attribute according to the standard of Wi-Fi Alliance;

sign, by the access point, the requested access point information, the requested access point information being received in response to the request and including a signed identification, a signed capability, and a signed service information of the access point, the random number of the request, and at least the vendor specific attribute according to the standard of Wi-Fi Alliance for verification prior to authentication with the access point when authentication is performed or prior to associating with the access point when authentication is not performed;

build, by the access point, a response to the request comprising the signed access point information; and provide, by the access point, for transmission of the response.

12. The apparatus of claim 11, the apparatus further comprises:

sign the requested access point information using information in a digital certificate.

13. An apparatus comprising:

at least one processor; and at least one memory including computer program code, the at least one memory and the computer program code configured to, with the at least one processor, cause the apparatus to perform at least the following:

receive, when an authentication is to be performed, a request for signed access point information, wherein the request is received, by an access point, prior to authentication;

receive, when the authentication is not to be performed, the request for the signed access point information, wherein the request is received, by the access point, prior to association, wherein the signed access point information comprises at least one of a service set identifier, media access control address, uniform resource identifier, services list, network access identifier realm list, or fully qualified domain name list, the request for the signed access point information including a random number and at least a vendor specific attribute according to the standard of Wi-Fi Alliance;

provide, by the access point, for transmission of the request to a third party entity, wherein the request is provided for transmission to the third party entity over a secure connection;

receive, by the access point, a response to the request comprising the signed access point information from the third party entity, wherein the response is received from the third party entity over a secure connection, the signed access point information being provided in response to the request and including a signed identification, a signed capability, and a signed service information of the access point, the random number of the request, and at least the vendor specific attribute according to the standard of Wi-Fi Alliance for verification prior to authentication with the access point when authentication is performed or prior to associating with the access point when authentication is not performed; and provide, by the access point, for transmission of the response.

14. The apparatus of claim 13, wherein the signed access point information from the third party entity is signed using information in a digital certificate.

15. A method for performing network, capability, and service discovery, the method comprising:

receiving, when an authentication is to be performed, a request for signed access point information, wherein the request is received, by an access point, prior to authentication;

receiving, when the authentication is not to be performed, the request for the signed access point information, wherein the request is received, by the access point, prior to association, wherein the signed access point information comprises at least one of a service set identifier, media access control address, uniform resource identifier, services list, network access identifier realm list, or fully qualified domain name list, the request for the signed access point information including a random number and at least a vendor specific attribute according to the standard of Wi-Fi Alliance;

providing, by the access point, for transmission of the request to a third party entity, wherein the request is provided for transmission to the third party entity over a secure connection;

receiving, by the access point, a response to the request comprising the signed access point information from the third party entity, wherein the response is received from the third party entity over a secure connection, the signed access point information being provided in response to the request and including a signed identification, a signed capability, and a signed service information of the access point, the random number of the request, and at least the vendor specific attribute according to the standard of Wi-Fi Alliance for verification prior to authentication with the access point when authentication is performed or prior to associating with the access point when authentication is not performed; and providing, by the access point, for transmission of the response.

* * * * *

UNITED STATES PATENT AND TRADEMARK OFFICE
CERTIFICATE OF CORRECTION

PATENT NO. : 9,548,977 B2  Page 1 of 1
APPLICATION NO. : 13/514290
DATED : January 17, 2017
INVENTOR(S) : Gabor Bajko It is certified that error appears in the above-identified patent and that said Letters Patent is hereby corrected as shown below:

On the Title Page

In (75) Inventor:, Line 1, inventor "Bajko Gabor" should read --Gabor Bajko--.

Signed and Sealed this
Second Day of May, 2017

Michelle K. Lee
*Director of the United States Patent and Trademark Office*